(12) United States Patent
Allen

(10) Patent No.: US 6,280,532 B1
(45) Date of Patent: Aug. 28, 2001

(54) LAWN VACUUM ATTACHMENT AND METHOD

(76) Inventor: J. Scott Allen, 3600 Kirby Dr., Greensboro, NC (US) 27403

( * ) Notice: Subject to any disclaimer, the term of this patent is extended or adjusted under 35 U.S.C. 154(b) by 0 days.

(21) Appl. No.: 09/444,262

(22) Filed: Nov. 22, 1999

(51) Int. Cl.[7] ..................................................... A47L 9/02
(52) U.S. Cl. ................... 134/21; 15/405; 15/328
(58) Field of Search ..................... 15/328, 329, 330, 15/405, 354; 134/6, 21

(56) References Cited

U.S. PATENT DOCUMENTS

| | | |
|---|---|---|
| 4,076,460 | 2/1978 | Roof . |
| 4,132,507 * | 1/1979 | Akiyama et al. ................... 15/405 |
| 4,221,018 | 9/1980 | Hajdu . |
| 4,227,280 * | 10/1980 | Comer ................................. 15/405 |
| 4,325,163 | 4/1982 | Mattson et al. . |
| 4,403,371 * | 9/1983 | Kiyooka ............................. 15/328 |
| 5,018,239 * | 5/1991 | Dobric ................................. 15/328 |
| 5,090,088 * | 2/1992 | Toth ..................................... 15/405 |
| 5,245,726 | 9/1993 | Rote et al. . |
| 5,294,063 * | 3/1994 | Bote .................................... 15/405 |
| 5,440,781 * | 8/1995 | Kitazawa et al. .................... 15/405 |
| 5,511,281 | 4/1996 | Webster . |
| 5,522,115 | 6/1996 | Webster . |
| 5,638,574 | 6/1997 | Haupt et al. . |
| 5,707,017 | 1/1998 | Paolucci et al. . |
| 5,794,306 | 8/1998 | Firdaus . |
| 5,819,364 * | 10/1998 | Sham .................................. 15/329 |
| 5,894,630 * | 4/1999 | Bitner et al. ....................... 15/405 |
| 6,009,595 * | 1/2000 | Leasure et al. .................... 15/405 |

OTHER PUBLICATIONS

Advertisement for Yardvark blower, Greensboro News & Record 10, Nov. 1999.

* cited by examiner

Primary Examiner—Terrence R. Till

(57) ABSTRACT

An attachment converts a standard hand-held lawn vacuum into a wheeled device for precisely cleaning leaves and debris from lawns and other surfaces. Wheels are mounted through an adjusting mechanism to allow the user to selectively vary the height of the nozzle to the lawn and thus the vacuum force applied. Various conventional lawn vacuums can be employed with the attachment which ensures time, energy and labor savings while providing a more precisely vacuumed lawn.

7 Claims, 6 Drawing Sheets

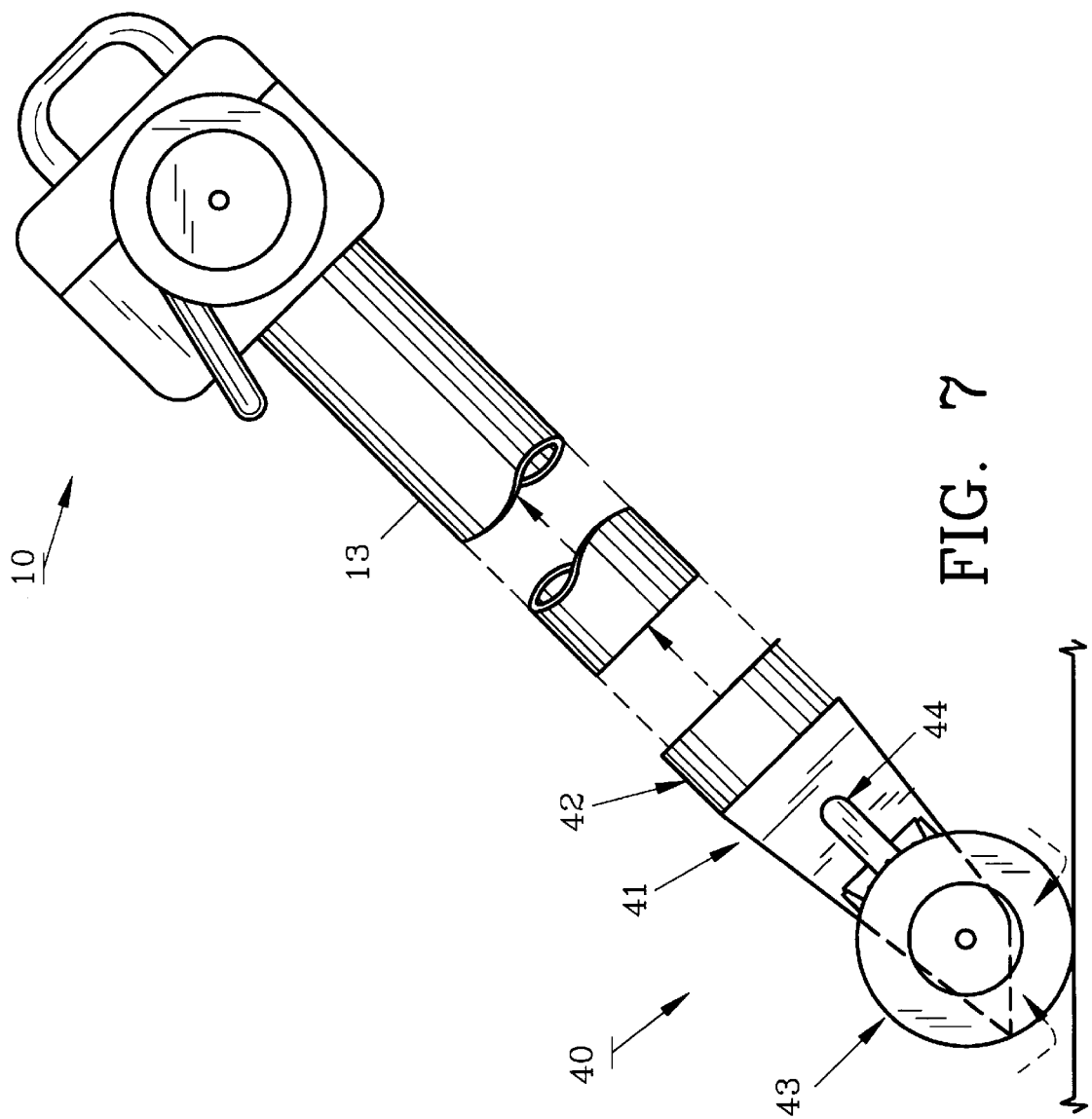

LAWN VACUUM ATTACHMENT AND METHOD

FIELD OF THE INVENTION

The invention herein pertains to a lawn vacuum attachment and particularly to an attachment which is removably affixed to a conventional hand-held lawn vacuum.

BACKGROUND AND OBJECTIVES OF THE INVENTION

In recent years homeowners and others have devoted more time and energy than ever before creating and maintaining a "manicured" lawn. Such homeowners frequently trim the grass and thereafter remove all leaves, twigs, grass clippings and other debris from the lawn. Various manufacturers have capitalized on this market by providing, in addition to more versatile lawnmowers, weed trimmers and the like, an abundant supply of hand-held pneumatic devices (both electrical and gasoline powered) to vacuum and/or blow leaves and debris from the lawn. Such vacuum/blowers are relatively light in weight but are tiring when carried by an adult for extended periods of time during operation. U.S. Pat. Nos. 5,522,115; 5,638,574 and 4,325,163 show but a few of the vacuum/blowers now available. However, standard hand-held vacuum/blowers do not always provide uniform air movement to a lawn. For example, during a vacuum operation, certain areas of a lawn may be adequately cleaned of leaves and trimmings while other areas are inadvertently skipped, requiring the equipment user to return or double back to remove all leaves visible. This is extremely troublesome and time consuming while vacuuming large lawns and lawns which have uneven surfaces.

Thus, in order to increase the user's convenience and to save time and energy in the lawn vacuuming process, the present invention was conceived and one of its objectives is to allow users to uniformly vacuum a lawn or other surface at a consistent vacuum height regardless of its size, flatness or texture without becoming overly tired in the process.

It is yet another objective of the present invention to provide a lawn vacuum attachment which can be mounted on any of a number of standard leaf blower/vacuum devices and to increase the width of the suction opening.

It is also an objective of the present invention to provide an attachment for a standard lawn vacuum which allows the user to adjust the nozzle height, depending on the particular lawn, driveway, pavement or other surface conditions encountered.

It is a further objective of the present invention to provide an attachment and method which can be easily affixed or removed from a conventional hand-held lawn vacuum without special tools or training.

Various other objectives and advantages of the present invention will become apparent to those skilled in the art as a more detailed description is set forth below.

SUMMARY OF THE INVENTION

The aforesaid and other objectives are realized providing a preferred embodiment of a lawn vacuum attachment having a nozzle with wheels positioned at opposing sides thereof. In another embodiment a slotted tubular member acts as a nozzle and is in fluid communication with a central conduit. The central conduit can be slidably engaged with the suction pipe of a conventional hand-held lawn vacuum to allow the attachment to be rolled along a lawn or other surface. The wheels include means for height adjustment whereby the nozzle can be raised or lowered at the election of the user to increase or decrease the suction force on the ground below.

The method of removing leaves includes (in one embodiment) forming the attachment such as by utilizing a slotted tubular member formed from polyvinyl chloride (PVC) pipe and mounting wheels at each end thereof. A central conduit is joined to the tubular member for insertion into a suction tube of a conventional hand-held lawn vacuum. With the attachment so connected, the user can then manually roll the attachment over the lawn while holding the lawn vacuum as it operates, to uniformly, thoroughly and consistently remove leaves and other debris.

BRIEF DESCRIPTION OF THE DRAWINGS

FIG. 7 shows a side view of the preferred embodiment as seen in FIG. 6.

DESCRIPTION OF THE DRAWINGS AND OPERATION OF THE INVENTION

Figure 1:
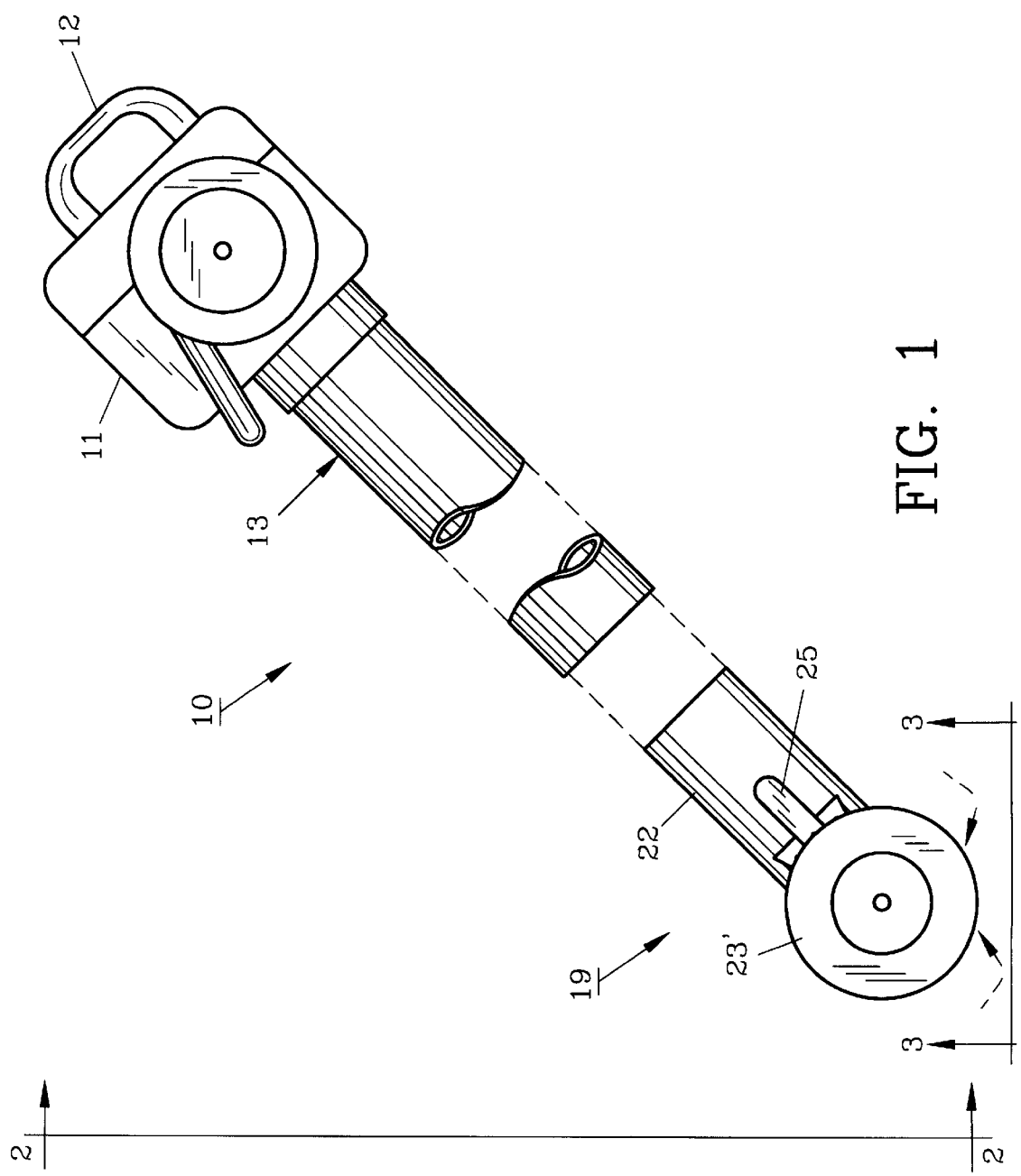
FIG. 1 depicts a side elevational view of a conventional lawn vacuum with one embodiment of the attachment of the invention exploded therefrom.

For a better understanding of the invention and its operation, turning now to the drawings, FIG. 1 shows in combination a side view of a standard lawn vacuum 10 having a motor housing 11, housing handle 12 and a suction pipe 13 (shown fragmented) and attachment 19. Lawn vacuum 10 may be powered by a conventional gasoline engine or an electric motor as is standard in the industry. Attachment 19 includes nozzle 20 (FIG. 2) having tubular member 21 and central conduit 22 which is in fluid communication with tubular member 21. Nozzle 20 may be formed from a polymeric material, such as polyvinyl chloride (PVC) pipe. Wheels 23, 23' are affixed to tubular member 21 by conventional adjusting mechanisms 24, 24' as are used on standard lawnmower wheels as shown in more detail in FIGS. 4 and 5.

Figure 4:
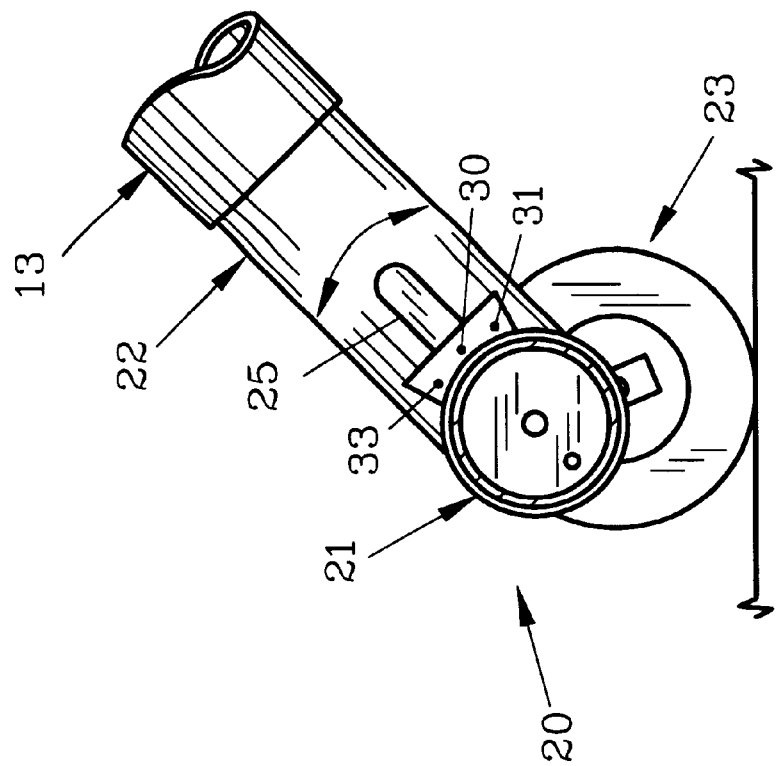
FIG. 4 pictures a side view of the attachment along lines 4—4 as seen in FIG. 2.

In FIG. 4, handle 25 can be moved as shown by the curved arrow to raise and lower nozzle 20. For example, handle 25 when raised (moved counterclockwise) lowers tubular member 21 and brings it closer to the ground or other surface to provide a stronger vacuum force to the ground. A stronger vacuum may be required, such as when leaves are heavy from rainfall or when larger leaves or debris are being collected. Likewise, handle 25 can be moved in a clockwise direction to raise tubular member 21 relative to wheel 23, from its neutral position as shown in FIG. 4 for less vacuum force. As further shown in FIG. 5, handle 25 has three positions for raising and lowering tubular member 21. Handle 25 includes stud 30 which will seat or engage in apertures 31, 32 or 33 as desired on axle plate 28 for a selected height of tubular member 21.

Figure 2:
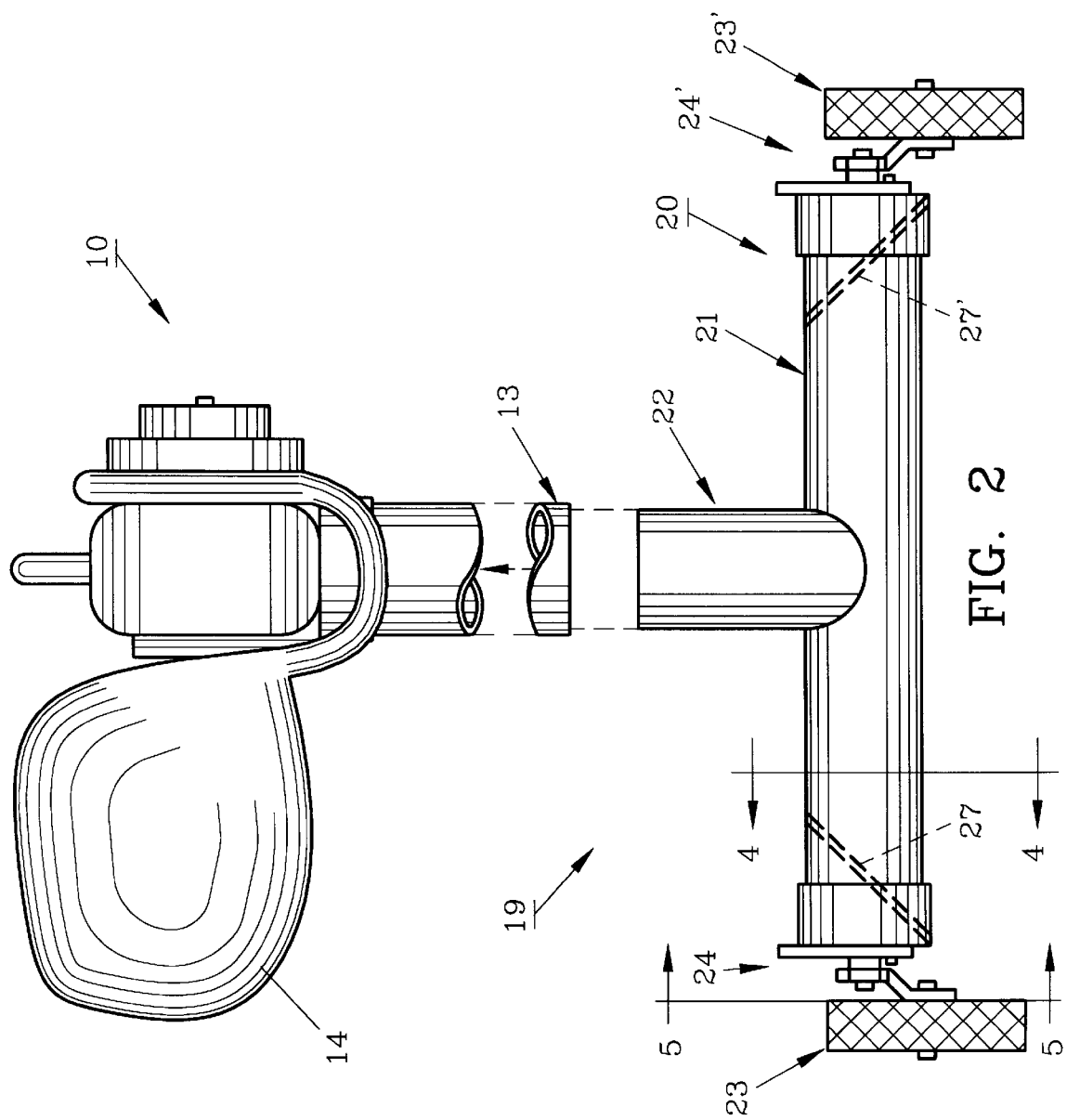
FIG. 2 shows a front view of the device as seen in FIG. 1 along lines 2—2.

In FIG. 2, central conduit 22 is shown as being frictionally slidable within suction pipe 13 although other releasable means of joining attachment 19 to lawn vacuum 10 may be utilized. As central conduit 22 is tightly engaged within suction pipe 13, leaves and other debris are urged during collection into tubular member 21 through slot 26 (FIG. 3) then through central conduit 22, through suction pipe 13 and on into collection bag 14. Slot 26 extends along the bottom substantially the entire length of tubular member 21 and includes a pair of baffles 27, 27' at each end thereof to allow debris to flow smoothly therethrough.

Figure 3:
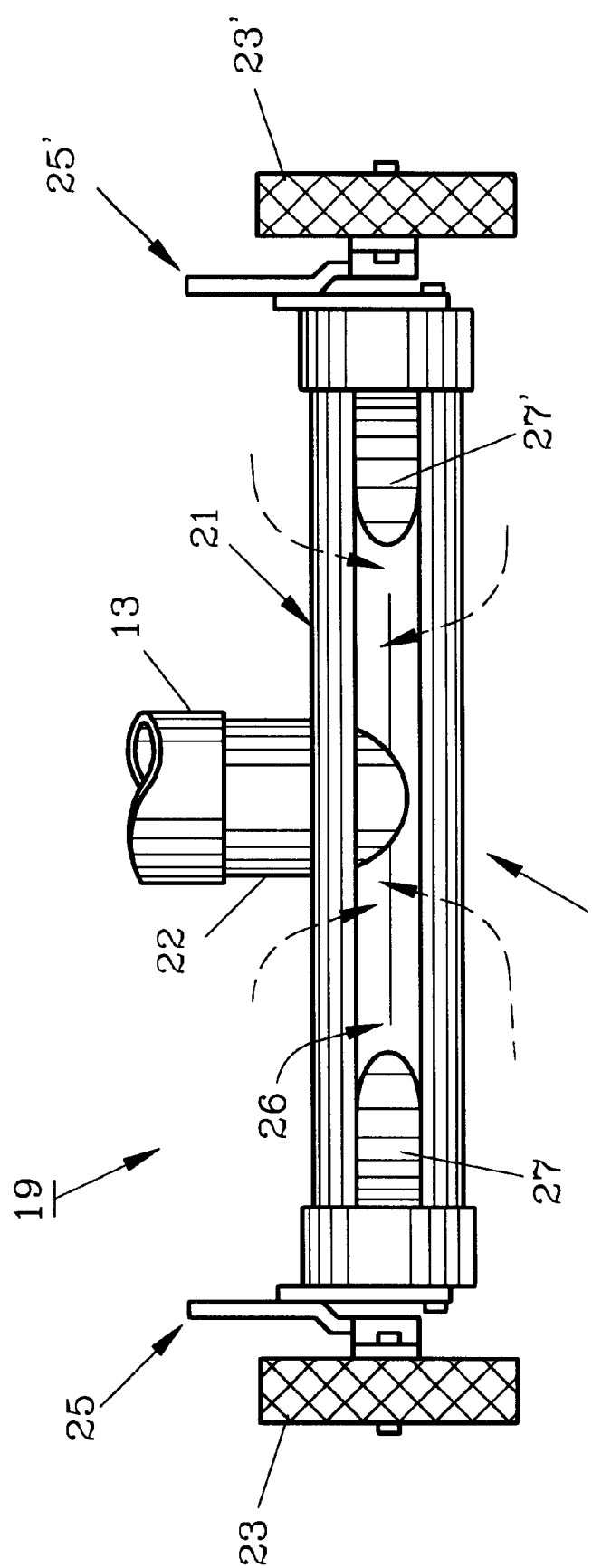
FIG. 3 demonstrates a bottom view of the attachment of FIG. 1 with the intake slot therein as seen along lines 3—3 of FIG. 1.
Figure 5:
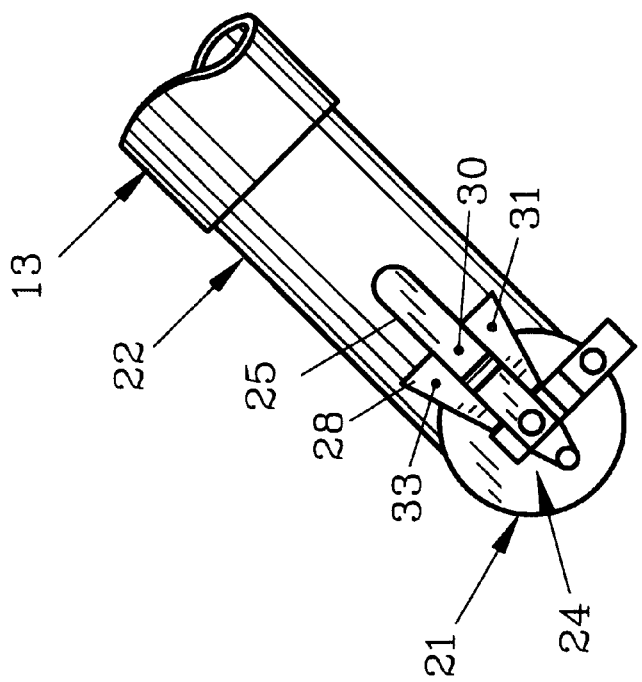
FIG. 5 features a side elevational view of certain parts of the attachment as shown along lines 5—5 of FIG. 2.

As earlier described above, the method of removing leaves from a lawn utilizing a hand-held vacuum includes the step of forming attachment 19 as shown in FIGS. 1, 2 and 3 which includes nozzle 20 having a slotted tubular member 21 with a central conduit 22 mounted perpendicular thereon and in fluid communication therewith. Wheels 23, 23' are opposingly attached to tubular member 21 at each end, preferably through adjusting mechanism 24 for height selection as shown in FIGS. 4 and 5. Thus, by sliding central conduit 22 into suction pipe 13 as shown in FIG. 1 of conventional hand-held vacuum 10, attachment 19 can then be rolled along the ground by manually holding lawn vacuum 10 while it runs. Leaves will be easily sucked into storage bag 14, seen in FIG. 2. Bag 14 is emptied as needed, reattached and the lawn vacuuming process continued. It has been found that attachment 19 provides convenience to the user while saving time and labor as a more uniform, and thorough vacuum process is completed.

Figure 6:
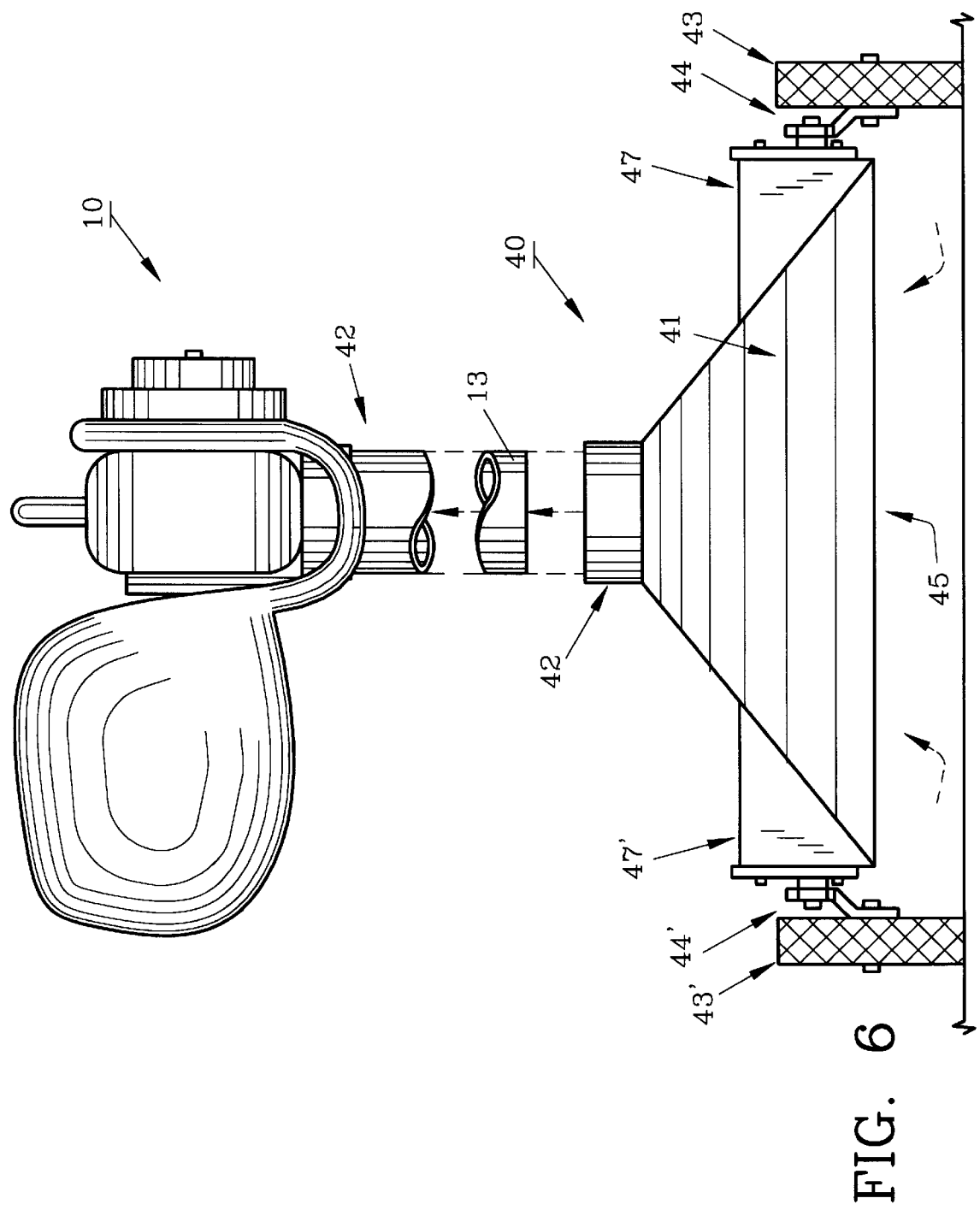
FIG. 6 illustrates a front view of preferred form of the invention.

The preferred embodiment of the invention is demonstrated in FIG. 6 whereby attachment 40 includes wedge-shaped nozzle 41 which is connected to or integrally formed at its upper end such as by injection molding with cylindrical portion 42 which acts as a means to join attachment 40 to suction pipe 13 of lawn vacuum 10 by frictional engagement therewith. Wheels 43, 43' are attached to nozzle 41 on opposing sides through conventional means 44, 44' for adjusting nozzle 41's height above the ground or other surface as earlier discussed. Wheel mounts 47, 47' are formed with or affixed to nozzle 41 and support means 44, 44'. Nozzle 41 includes opening 45 which serves as an intake for leaves and debris as attachment 40 is rolled over a lawn with lawn vacuum 10 running. Opening 45 extends between wheels 43, 43' substantially the entire width of nozzle 41 to provide a wide intake, relative to the diameter of suction pipe 13 for efficient vacuuming purposes.

FIG. 7 shows a side view of lawn vacuum attachment 40 which may be for example molded of PVC or other suitable polymeric materials or may be fabricated from metal such as aluminum.

Those skilled in the art will be able to modify various lawn vacuums and nozzles as explained herein and such modifications and changes will not depart from the scope of the invention as set forth in the appended claims.

I claim:

1. An attachment for a hand held lawn vacuum comprising: a nozzle, a means to join said nozzle to a lawn vacuum, said joining means mounted on said nozzle, a first wheel, said first wheel affixed to said nozzle, and means to adjust the height of said nozzle from the ground, said adjusting means attached to said wheel whereby said attachment can be positioned on a lawn vacuum and manually rolled over the ground for collecting leaves and debris.

2. The attachment of claim 1 wherein said joining means comprises a conduit, said conduit in fluid communication with said nozzle.

3. The attachment of claim 1 further comprising a second wheel, said second wheel affixed to said nozzle opposing said first wheel.

4. The attachment of claim 1 wherein said adjusting means comprises a lever.

5. In a hand held lawn vacuum the improvement comprising: an attachment to allow said vacuum to roll along the ground, said attachment comprising a nozzle, a means to join said nozzle to said lawn vacuum, said joining means mounted on said nozzle, a pair of wheels, one each of said pair of wheels mounted at opposite sides of said nozzle, means to adjust the height of said nozzle from the ground, said height adjustment means mounted on said nozzle, whereby said attachment can be connected to said lawn vacuum and rolled along the ground to remove leaves and debris.

6. A method of removing leaves from a lawn utilizing a hand held vacuum having a suction pipe comprising the steps of:

(a) forming an attachment having a nozzle, (b) mounting wheels having a means for height adjustment on said nozzle, (c) joining said nozzle to said suction pipe, (d) adjusting the height of the nozzle, and (e) rolling said hand held vacuum with said nozzle attachment over the lawn to remove leaves therefrom.

7. The method of claim 6 wherein the step of joining said nozzle includes the step of providing fluid communication between said nozzle and said suction pipe.

* * * * *